United States Patent [19]
Mitrofanov

[11] 3,892,990
[45] July 1, 1975

[54] BROMINE-QUENCHED HIGH TEMPERATURE G-M TUBE WITH PASSIVATED CATHODE

[75] Inventor: Nicolas Mitrofanov, Cleveland, Ohio

[73] Assignee: Kewanee Oil Company, Bryn Mawr, Pa.

[22] Filed: July 31, 1972

[21] Appl. No.: 276,693

[52] U.S. Cl. ............... 313/93; 316/20; 316/21; 316/22; 29/25.11; 204/35 R
[51] Int. Cl. .......................................... H01j 9/38
[58] Field of Search ............ 117/201, 118, 62, 217, 117/227; 313/93; 204/290 F; 316/17–22

[56] References Cited
UNITED STATES PATENTS

| | | | |
|---|---|---|---|
| 3,207,938 | 9/1965 | Anton | 313/93 |
| 3,342,538 | 9/1967 | Mitrofanov | 316/22 |
| 3,632,498 | 1/1972 | Beer | 204/290 F |
| 3,663,280 | 5/1972 | Lee | 204/290 F |
| 3,663,414 | 5/1972 | Martinsons | 204/290 F |

*Primary Examiner*—Leon D. Rosdol
*Assistant Examiner*—M. F. Esposito
*Attorney, Agent, or Firm*—Cain and Lobo

[57] ABSTRACT

A bromine doped self-quenching Geiger-Mueller tube having an operational life expectancy in excess of 1,200 hours at a temperature of 315°C. The tube comprises a passivated metal coated cathode which is conditioned or aged for operation at room temperature, thus obviating the necessity of thermally cycling the tube at progressively elevated temperatures. Useful metal coatings for the cathode include chromium, platinum, and nickel-copper alloys deposited in a layer less than about 1 mil thick. A method for passivating the metal coated cathode and subsequently conditioning the tube and its contents is disclosed.

4 Claims, No Drawings

BROMINE-QUENCHED HIGH TEMPERATURE G-M TUBE WITH PASSIVATED CATHODE

BACKGROUND OF THE INVENTION

This invention pertains to the art of producing radiation detection devices and, more particularly, to an extended life, high-temperature, halogen self-quenching Geiger-Mueller counter. More particularly, it is directed to a bromine-quenched tube capable of operating at temperatures in excess of 315°C. for periods in excess of 1,200 hours. This invention is applicable to both cylindrical counters as well as to "point" counters which use a sharp, pointed anode and a flat plane or sphere as the cathode. Since most counters used today are cylindrical, it is to this form that this invention is particularly directed.

Geiger-Mueller counting tubes have been used for many years to detect and measure radiation levels at relatively low temperatures from various sources. A typical industrial use is in the measurement of the thickness of sheet material. A source of beta rays is placed on one side of the material and a Geiger-Mueller counter on the other. Some of the beta rays are absorbed in the material, and the counter responds to changes in absorption caused by changes in the thickness. Continuous accurate measurement of the thickness can be made even if the sheet material is moving at high speed. In medicine, radioactive sources are often detected with Geiger-Mueller counters which can locate the position of distribution of the radioactive material after it has been administered. In such applications, it is important to determine the total radiation dosage and to monitor the radiation; Geiger-Mueller counters are used to do so. When used in the foregoing and similar applications at ambient or relatively low temperatures below about 175°C., the life of a Geiger-Mueller tube of acceptable sensitivity presents no serious problems.

In other industrial applications, such as in the detection of the rate of flow of oil for lubricating and cooling the turbines in a jet aircraft, for example a Type 747 Boeing, it is essential that the tube be operable at temperatures in excess of 315°C. for extended periods of time. In this application, a source of gamma radiation is placed on one side of the oil tank and a counting tube on the other, with the oil cascading between them. Some of the gamma rays are absorbed in the oil, and the counter responds to changes in absorption caused by changes in oil flow. Thus, a change in the flow rate of oil is instantly transmitted to the crew, permitting it to take corrective action. In another application, geologists use Geiger-Mueller counting tubes for mineral exploration and oil-well logging. Minerals containing uranium and the like are radioactive, and can be readily detected. In oil-well logging, the radiation source irradiates the surrounding strata and the counting tube detects radiation emanating from the walls of the well. At great depths within the earth, such as those encountered in geothermal steam-well logging, temperatures may exceed 350°C. and it is imperative that the Geiger-Mueller tube work effectively at such temperatures. Where a Geiger-Mueller tube is to be used in such service, particularly at temperatures in excess of about 300°C., and more particularly where it is demanded that the life of the tube be in excess of 1,200 hours, no prior art tube meets the requirement.

The method of thermally cycling a halogen-saturated cathode, as disclosed in my U.S. Pat. No. 3,342,538, was directed towards increasing the temperature tolerance of an acceptably sensitive Geiger-Mueller tube. Though this method yields high temperature operational capability, it has subsequently been discovered that the life of the tube is severely shortened as operational temperature is increased above 200°C.

It is well-known that halogens, such as bromine and chlorine, make excellent quench gases for self-quenching Geiger-Mueller tubes, but they react with the metallic surfaces of the anode and cathode by corrosive chemical reaction, upsetting the balance of quench gas in the tube and contributing to false readings which get progressively worse as the life of the tube is prolonged. Bromine particularly has been widely used as a quench gas. Unfortunately, bromine has an unacceptable temperature sensitivity and it is to the solution of this problem that my aforementioned patent taught the method of increasing operating temperature by thermally cycling filled Geiger-Mueller tubes at progressively higher temperatures. Unexpectedly, the use of a passivated coating of chromium, platinum, or an alloy containing a major portion of nickel and a minor portion of copper has now been found to obviate thermal cycling and permits pressure cycling the filled tubes at room temperature. Most unexpectedly, the tube of the instant invention not only has high temperature operability, but surprisingly extended life.

It is assumed that extended life and high temperature operability are not to be purchased at the expense of other desirable operating characteristics of a Geiger-Mueller tube which are perquisites of satisfactory operation and the improved tube of this invention is consistent with this assumption. For example, the sensitivity and stability of the tube must be maintained despite the high temperature operation of the tube. Operating characteristics desirably built into an acceptably reliable tube are discussed in my aforementioned U.S. patent.

SUMMARY OF THE INVENTION

It has been discovered that a self-quenching Geiger-Mueller tube in which a halogen containing inert gas is confined, may be operated for extended periods of time at elevated temperatures when the cathode is coated with a thin layer, less than about 1 mil thick, of chromium, platinum, or an alloy of nickel and copper, and thereafter passivated.

It has been found that a unique method of passivating the aforementioned metal coatings unexpectedly permits the conditioning or aging of the assembled tubes at room temperature, for reliable high temperature service, without thermally cycling the tubes at progressively elevated temperatures.

In a specific and preferred embodiment of the invention, it has been discovered that a Geiger-Mueller tube containing about 1–1.5% bromine quench gas, about 0.1% argon and the remainder neon, and utilizing a chromium stainless steel cylindrical tube as a cathode, may be prepared for dependable operation at temperatures in excess of 315°C. with an expected useful life in excess of 1,200 hours by a novel process. This specific process comprises depositing a coating of chromium from about 5 to about 50 microns thick on the inner surface of the cylindrical stainless steel cathode, rinsing the coated cathode with distilled water and drying it in a hot, high-vacuum oven. The components of the Geiger-Mueller tube comprising the dried, chrome-plated cathode, a 446 stainless steel anode, a suitable ceramic plug, glass seals to hermetically seal the chamber in which the electrodes are housed, and other conventional components are then assembled and placed in a fill station for passivation and conditioning. Passivation of the tube is effected by first drying the tube assembly at the fill station under high vacuum at elevated temperature, then admitting oxygen to contact and oxidize the metal surfaces until essentially all metal surfaces in contact with the gas consist essentially of oxides. The oxygen is then purged from the tube, and the tube is cooled to about room temperature when an inert gas such as neon containing a relatively high concentration of bromine of about 10% (referred to as "saturation gas"), is introduced into the tube which is then subjected to a high frequency coil discharge so as to saturate with bromine all surfaces in contact with the gas. The saturation end point is indicated by no change in the color of the fluorescence of the gaseous mixture in the tube from the beginning to the end of the high frequency discharge. The saturation gas containing the relatively high concentration of bromine is pumped out and replaced with the final fill inert gas mixture (referred to as "sealing gas") to be sealed in the operational tube. The starting voltage is read as soon as this is done and the tube is conditioned or aged by checking the starting voltages at approximately 24-hour intervals and returning the starting voltage to substantially the original reading by adjusting the sealing gas pressure in the tube at room temperature. Successive 24-hour starting voltage readings which remain essentially constant indicate that the tube is ready to be "tipped off" the filling station and commence its high-temperature, extended life service.

DETAILED DESCRIPTION OF THE INVENTION

In a specific embodiment of the invention, the cylindrical cathode of the Geiger-Mueller tube is made from a chromium-containing stainless steel, and preferably a high chromium stainless steel such as 446 stainless. Other metallic cathodes may be used provided they are relatively resistant to attack by halogen gas, and particularly bromine or chlorine, at elevated temperatures up to about 450°C., and which exhibit an affinity for a relatively thin coating of metallic chromium, platinum, or an alloy having a major amount of nickel and a minor amount of copper. The aforementioned coating is deposited in a thickness less than about 1 mil thick on the inner surface of the cathode, which in conventional cylindrical counters, is the electrode with the larger surface area. More preferably, the coating is deposited in a thickness ranging from about 5 to about 50 microns. Any method for depositing the metal on the large surface area cathode may be utilized, such as for example, spraying the molten metal onto the surface, depositing metal from an electroless bath, or by electrodeposition of the metal from an appropriate electrochemical coating bath. Where, for example, a chromium coating is to be deposited, a conventional chromium plating bath for the deposition of hard chrome is used. The nickel-copper alloy and platinum may similarly be electrodeposited. Iridium is deposited from a fused salt bath.

The electrodeposited coating of metal is then rinsed with deionized water several times to rid the cathode of all electro-chemical bath components and is then dried in a high-vacuum oven at a temperature of about 600°C. under vacuum of about $10^{-6}$ Torr. The dried coated cathode is used to complete the assembly of a counter, also referred to simply as a tube irrespective of the stage of completion of the device, utilizing a 446 stainless steel anode, a ceramic plug, suitable hermetic glass seals for sealing in the gaseous mixture, and other conventional tube components. Though 446 stainless steel is a preferred material for the anode, the choice of material is not critical since the surface area of the anode is relatively small in comparison with that of the cathode. Thus, even the choice of an inferior material may not be inimical to acceptable performance. However, the coefficients of expansion of the cathode, anode, ceramic plugs and glass should be matched. The coefficient of expansion of the coated metal is relatively unimportant.

The tube assembly is placed in a fill station for passivating the contents of the tube and, thereafter, for conditioning the counter or tube for high temperature operation. At the fill station, the tube is heated in the range from about 350°–400°C. under high vacuum at a pressure of about $10^{-6}$ Torr for about 2 hours. Thereafter, an oxygen containing gas such as an inert gas containing oxygen, or more preferably pure oxygen, at a pressure of from about 2 to about 3 mm. Hg. absolute is flowed into the tube so as to contact the contents of the tube and particularly the inner surface of the cathode. A high voltage direct current power source, preferably having an output voltage of 500–1,000 volts sufficient to cause the gas in the tube to ionize, is applied across the tube to accelerate formation of metal oxides on the inner surface of the cathode. Contact with the oxygen containing gas or pure oxygen is maintained for sufficient time to transform essentially the entire inner metal surface to the oxide form, the period ranging in time from about 10 minutes to about 1 hour, depending upon the composition of the oxidizing gas, the surface area of the cathode and the particular coating deposited on the cathode.

After oxidation is complete as described hereinabove, the oxygen is purged from the chamber of the tube by heating the tube to a temperature in the range from about 300°–450°C. under a high vacuum pump capable of exhausting the tube to a pressure of about $10^{-6}$ Torr. Evacuation of the chamber is continued until substantially all traces of oxygen are removed from within the chamber. The tube is then permitted to cool.

The cooled tube is filled with a gaseous mixture of saturation gas including a halogen such as bromine or chlorine, and more preferably bromine, which is the same halogen to be used in the sealing gas for the self-quenching extended life tube. This gaseous mixture, referred to as the saturation gas, is preferably composed of an inert gas such as neon and a relatively high percent of bromine. A typical composition for saturation gas is 90% neon and 10% bromine. The saturation gas is flowed into the tube at room temperature under a pressure in the range from about 1 to about 10 mm. Hg. absolute.

A high frequency power source is then applied across the chamber to generate bromine ions which are absorbed onto the surface of the electrodes. Any method for producing bromine ions may be used, such as heating the tube, applying a direct current discharge across it, or the like. Most preferred is the use of a high-frequency coil with an output in the range of from about 30 to 40 megacycles, which when applied to the saturation gas within the chamber causes the gaseous mixture to fluoresce. The discharge is maintained for about 2 minutes, the tube is allowed to cool and the discharge applied a second time for about the same period of time, namely 2 minutes. The color of the fluorescing gas is noted and, when there is essentially no change of color of fluorescence, from the beginning to the end of the period, it is deemed that the saturation end-point has been reached. It will be recognized that though the tube is at ambient room temperatures, the temperature of the gaseous mixture within the tube, while being subjected to the high frequency power source, may be substantially higher.

The tube is out-pumped and the saturation gas mixture is replaced with the final fill or sealing mixture including approximately 0.1% argon, 1.5% bromine, and the remainder neon. The sealing gas mixture is pressurized into the chamber of the tube at a pressure in the range from about 100–500 mm. Hg. abs. Immediately thereafter, the starting voltage is read. The tube is permitted to age overnight, preferably for a period of about 24 hours, after which the starting voltage is again read. It will be noted that the starting voltage has dropped, the precise magnitude of the drop depending upon the choice of electrodes, the halogen used, and the concentration of quench gas in the chamber. With bromine, utilizing a chromium-plated 446 stainless steel cathode, the initial drop in starting voltage after 24 hours is approximately 15 to 20 volts.

The sealing gas mixture is again pressurized into the chamber, increasing the pressure as is usually necessary, until the original starting voltage, approximately 600–610 volts, is reached. The tube is allowed to age for another 24-hour period and the starting voltage again is read at the end of that period. A drop in voltage is again noticed, except that the drop is substantially less than the drop noted in the first period. This procedure of repressurizing the tube is repeated until the original starting voltage is reached, and each time the tube is then permitted to age for a successive 24-hour period. This repressurizing procedure, referred to as "pressure cycling," is repeated until starting voltages read for successive periods remain essentially constant. When this stage is reached, the tube is ready for tip-off from the fill station and is ready for use at high temperature for extended periods of time. Utilizing this procedure, it has been found that bromine-quenched Geiger-Mueller tubes may be utilized at temperatures up to about 315° C. for periods of time in excess of 1,200 hours, and at temperatures up to about 400°C. for periods of several hours.

In production, a multiplicity of tubes are passivated and thereafter aged at a single fill station. It may be desirable to select a batch of tubes for those expected to provide the longest service at a predetermined high temperature. Indication as to which tubes may have longer life than others is provided by measuring starting voltages at predetermined elevated temperatures at spaced-apart intervals of time.

EXAMPLE

In accordance with one specific example of the present invention, a cylindrical tube of 446 stainless steel, to be used as the cathode of a Geiger-Mueller counter, is coated with an electrodeposited coating of metallic chromium on its inner surface, the thickness of the coating ranging from about 10 to about 20 microns. The electroplated cathode tube is then washed with distilled or deionized water so as to free the metal surface from all contaminants, and dried in a high vacuum oven at a temperature of about 600° C. at about $10^{-5}$ Torr. The cathode, along with a 446 stainless steel wire anode, is then assembled into a conventional Geiger-Mueller tube which is adapted to be placed in a fill station for further processing.

The tube is heated in an oven to a temperature in the range from about 350°–400° C. under high vacuum down to about $10^{-6}$ Torr. and maintained under these conditions for about 2 hours. Thereafter, the tube is permitted to cool and substantially pure oxygen is used to fill the tube until a pressure of from about 2 to 3 mm. Hg. abs. is attained. A direct current source of approximately 1,000 volts is discharged through the tube to generate oxygen ions and to accelerate conversion of the metal surfaces to the oxide form. The DC discharge is repeated several times with a frequency of about 3 times per 20 minutes for a total period of about 1 hour. The oxygen is thereafter purged from the tube and the tube out-pumped in an oven at a temperature of about 350°–400° C. under vacuum down to about $10^{-6}$ Torr.

The tube is thereafter cooled and the saturation gas mixture, containing approximately 10% bromine, 90% neon, and traces of argon, is supplied to the tube which is maintained at a pressure of about 2 to 3 mm. Hg. abs. A high frequency coil having an output between 30 and 40 megacycles is coupled across the tube, causing the contents of the tube to glow while generating bromine ions to saturate the surfaces within the tube. The discharge is maintained for about 2 minutes. The contents of the tube are then purged and fresh saturation gas is supplied to the tube, which is again pressurized to about 2 to 3 mm. Hg. abs. The discharge is repeated for an additional 2-minute period. The discharge is repeated with fresh saturation gas as many times as is necessary until no noticeable change in the color of the fluorescing gas is noted from the beginning to the end of the discharge. This indicates the saturation end-point for the tube.

The saturation gas mixture is out-pumped and replaced with the sealing mixture to be used in the final fill in the high temperature counter tube. This sealing mixture includes 0.1% argon, 1.5% bromine, and the remainder neon. Other inert gases, such as helium and argon, may be used, but neon is preferred. Immediately after being filled with the sealing mixture at a pressure from about 350–400 mm. Hg. abs., a starting voltage of from 600 to 610 volts is read. The tube is left on station for a 24-hour period, and the voltage is read again. A drop of from about 15 to 20 volts is noted. Additional sealing gas is pumped to the tube until the original starting voltage is attained. It is found that, generally, a slight increase in pressure will be required. The tube is permitted to age for an additional 24-hour period, after which the starting voltage is again read. A drop in voltage is again noticed, but the drop is substantially less, being in the range from about 5 to 10 volts. The tube is again pressurized with sealing gas mixture until the original starting voltage is attained. Again, an increase in pressure is required. After an aging period of 24 hours, the starting voltage is again checked. When successive starting voltages after a 24-hour aging period are found to be essentially the same, the tube is tipped off the filling station and adjudged ready to provide extended service at high temperatures in excess of 300° C. Tubes made as described in this example provide an operating life in excess of 1,200 hours at temperatures of about 315° C.

I claim:

1. In a method for increasing the high temperature operability of a Geiger-Mueller counter, comprising a relatively large surface area cathode sealingly confined in a chamber, wherein said chamber is filled with a halogen gas containing saturation gas and subjected to an electrical discharge to cause said halogen to be absorbed by said cathode surface, wherein said gaseous material is purged from said chamber and replaced with a sealing gas including at least some of said halogen gas, the improvement consisting of electro-depositing a coating of chromium, platinum, or a predominantly nickel-containing alloy less than about 1 mil thick upon said cathode surface, contacting said coating with an oxygen-containing gas, saturating the cathode surface with halogen gas until the saturation end-point is reached, purging the saturation gas, filling said chamber with a sealing mixture containing said halogen gas, pressurizing said chamber to a pressure in the range from about 100 to 500 mm. Hg. abs., reading the starting voltage, repeating said pressurizing of said chamber over a period of several days and reading the starting voltage after each repressurization until the starting voltage read is essentially constant, and then sealing said chamber so as to provide a passivated cathode surface and to extend the operating life of said counter.

2. The method of claim 1, wherein said halogen is bromine, said coating is chromium from about 5 to about 50 microns thick, and said passivating of said cathode surface provides said counter with an operating life in excess of 1,200 hours at a temperature of about 315° C.

3. In a Geiger-Mueller radiation detection tube wherein a relatively large surface area cathode and an anode are disposed in spaced-apart relationship in a sealed chamber confining a gaseous mixture including an inert gas quenched with sufficient bromine or chlorine to provide a predetermined degree of quench, the improvement consisting of an electro-deposited, oxidized and passivated coating of chromium, platinum, or an alloy containing a major amount of nickel and a minor amount of copper less than about 1 mil. thick upon the inner surface of said cathode, wherein said oxidized coating is saturated with a saturation gas mixture containing bromine and wherein said passivated coating results from pressurizing said tube to a pressure in the range from 100 to 500 mm. Hg. abs. at about room temperature with a sealing gas mixture containing bromine, reading the starting voltage, repressurizing said tube and reading starting voltage over a period of several days until successive starting voltage readings are essentially the same so as to indicate tube stability.

4. The radiation detection tube of claim 3, wherein said cathode and anode are chosen from a chromium-containing stainless steel, said inert gas is chosen from helium, argon, and neon, and is quenched with bromine, and said coating is chromium in a thickness from about 5 to about 50 microns so as to provide said tube with an operating life in excess of 1200 hours at a temperature of about 315° C.

* * * * *